(12) United States Patent
Sumiyoshi et al.

(10) Patent No.: US 8,112,276 B2
(45) Date of Patent: Feb. 7, 2012

(54) VOICE RECOGNITION APPARATUS

(75) Inventors: Yuki Sumiyoshi, Tokyo (JP); Reiko Okada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 967 days.

(21) Appl. No.: 12/083,607

(22) PCT Filed: Aug. 16, 2006

(86) PCT No.: PCT/JP2006/316108
§ 371 (c)(1),
(2), (4) Date: Apr. 15, 2008

(87) PCT Pub. No.: WO2007/069372
PCT Pub. Date: Jun. 21, 2007

(65) Prior Publication Data
US 2009/0259467 A1 Oct. 15, 2009

(30) Foreign Application Priority Data

Dec. 14, 2005 (JP) .................................. 2005-360821

(51) Int. Cl.
*G10L 15/00* (2006.01)
(52) U.S. Cl. ........ 704/244; 704/10; 704/275; 379/88.01
(58) Field of Classification Search .................... 704/10, 704/244, 275; 379/88.01
See application file for complete search history.

(56) References Cited

U.S. PATENT DOCUMENTS

| 5,577,164 | A | * | 11/1996 | Kaneko et al. ................ 704/275 |
| 6,112,174 | A | * | 8/2000 | Wakisaka et al. ............. 704/251 |
| 6,385,582 | B1 | | 5/2002 | Iwata |
| 2004/0030560 | A1 | * | 2/2004 | Takami et al. ................ 704/275 |
| 2005/0004798 | A1 | * | 1/2005 | Kaminuma et al. .......... 704/250 |
| 2005/0086056 | A1 | * | 4/2005 | Yoda et al. .................... 704/246 |

FOREIGN PATENT DOCUMENTS

| DE | 10045020 A1 | 5/2001 |
| EP | 0 789 224 A2 | 8/1997 |
| JP | 6-250687 A | 9/1994 |
| JP | 06-260689 A | 9/1994 |
| JP | 6-318097 A | 11/1994 |
| JP | 08-320697 A | 12/1996 |
| JP | 2589299 B2 | 12/1996 |
| JP | 10-143191 A | 5/1998 |
| JP | 2000-200093 A | 7/2000 |
| JP | 2001-083981 A | 3/2001 |
| JP | 2004-53742 A | 2/2004 |
| JP | 2004-109468 A | 4/2004 |
| JP | 2005-30982 A | 2/2005 |
| JP | 2005-285138 A | 10/2005 |
| JP | 2005-292476 A | 10/2005 |

* cited by examiner

*Primary Examiner* — Daniel D Abebe
(74) *Attorney, Agent, or Firm* — Birch, Stewart, Kolasch & Birch, LLP

(57) ABSTRACT

A voice recognition apparatus 10 carries out voice recognition of an inputted voice with reference to a voice recognition dictionary, and outputs a voice recognition result. In this voice recognition apparatus, a plurality of voice recognition dictionaries 23-1 to 23-N are provided according to predetermined classification items. The voice recognition apparatus further includes a voice recognition means 17 which carries out voice recognition of the inputted voice with reference to one of the voice recognition dictionaries so as to acquire the above-mentioned voice recognition result, an erroneous recognition judging means 15 which judges whether or not the voice recognition result indicates erroneous recognition, a recognition dictionary management means 19 which switches among the voice recognition dictionaries when the voice recognition means judges that the voice recognition result indicates erroneous recognition, and a voice recognition means 17 which carries out voice recognition of the inputted voice with reference to a switched-to voice recognition dictionary so as to acquire a voice recognition result.

8 Claims, 6 Drawing Sheets

| Classification Item | Dictionary Name |
|---|---|
| Hokkaido | Dictionary 23-1 |
| Tokyo | Dictionary 23-2 |
| Saitama | Dictionary 23-3 |
| Osaka | Dictionary 23-4 |

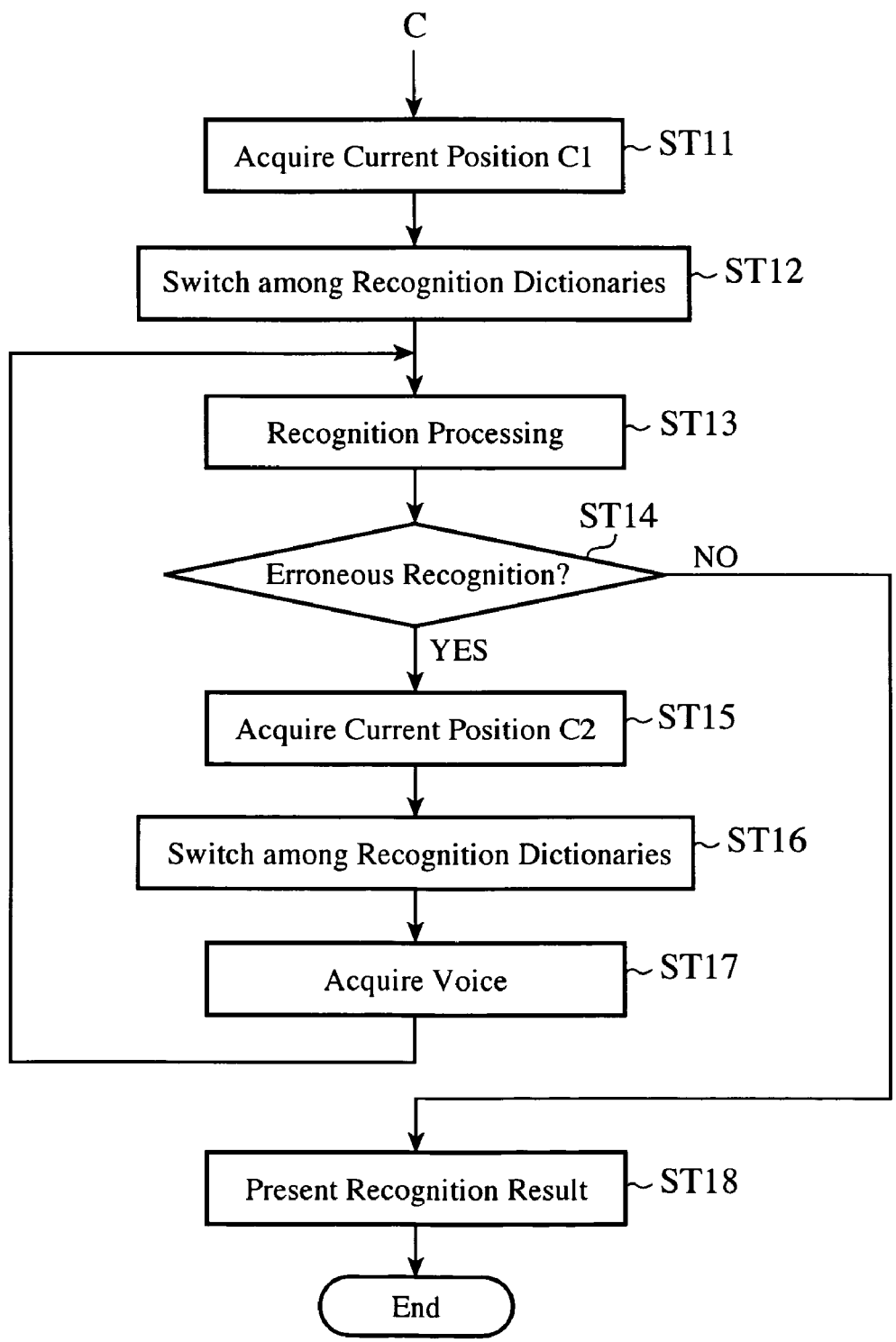

FIG. 6

| Priority | Classification Item | Dictionary Name |
|---|---|---|
| 4 | Hokkaido | Dictionary 23-1 |
| 1 | Tokyo | Dictionary 23-2 |
| 3 | Saitama | Dictionary 23-3 |
| 2 | Osaka | Dictionary 23-4 |

FIG. 7

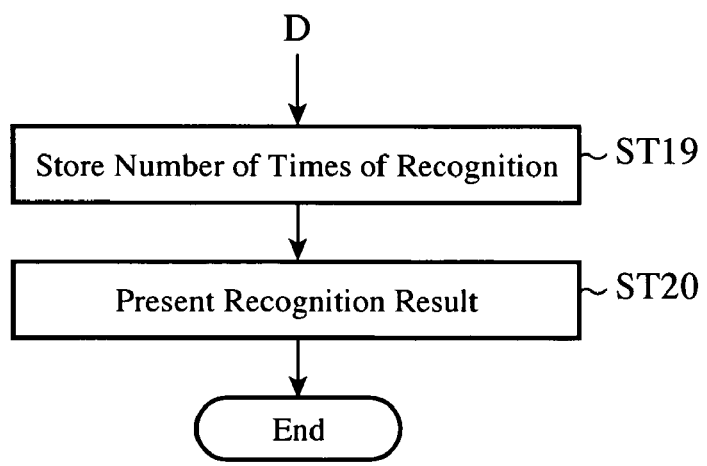

D → Store Number of Times of Recognition — ST19 → Present Recognition Result — ST20 → End

FIG. 8

| Number of Times of Recognition | Classification Item | Dictionary Name |
|---|---|---|
| 12 | Convenience Store | Dictionary 23-1 |
| 5 | Gas Station | Dictionary 23-2 |
| 1 | Family Restaurant | Dictionary 23-3 |

US 8,112,276 B2

VOICE RECOGNITION APPARATUS

FIELD OF THE INVENTION

The present invention relates to a voice recognition apparatus which is provided with a plurality of voice recognition dictionaries and which performs voice recognition. More particularly, it relates to a voice recognition apparatus for use in a car navigation apparatus and the like.

BACKGROUND OF THE INVENTION

Generally, a voice recognition apparatus performs voice recognition with reference to words (a vocabulary) registered into a voice recognition dictionary. Although many words need to be registered into the voice recognition dictionary in order to improve the voice recognition rate, registration of many words into the one voice recognition dictionary results in longer time to perform a search for a word through the voice recognition dictionary when performing voice recognition, and therefore increase in the time required to carry out the voice recognition processing (that is, the voice recognition processing speed decreases). In contrast, although decrease in the number of words registered into the voice recognition dictionary reduces the time required to perform a search for a word through the voice recognition dictionary, the voice recognition rate decreases.

To solve this problem, there has been provided a voice recognition apparatus which has a plurality of voice recognition dictionaries, and which is so constructed as to reduce the time required to perform a search for a word through each of the voice recognition dictionaries by searching through each of the voice recognition dictionaries in turn and to improve the voice recognition rate.

For example, there has been provided a voice recognition apparatus which compares the features of a voice inputted by an unspecified speaker with those of a voice stored in a voice dictionary file which is selected from a plurality of voice dictionary files (voice recognition dictionaries), which, when trying to detect a word whose matching degree reaches a reference value, if there does not exist any word whose matching degree reaches a reference value, stores, as a word candidate, a word having a relatively-high matching degree, switches to another voice dictionary file, compares the features of the inputted voice with those of an inputted voice corresponding to the word candidate stored in the switched-to voice dictionary file, and then determines a matching degree between them, and which, when any word whose matching degree reaches the reference value cannot be found out of the voice dictionary file which was selected for the first time, repeatedly carries out comparison with the inputted voice while switching among the voice dictionary files, and continues the recognition process of finding out a correct answer (for example, refer to patent reference 1).

Furthermore, there has been provided a voice recognition apparatus which, in order to change the specification of a voice recognition dictionary and carry out recognition processing again after it has performed an erroneous recognition, stores the inputted voice in a voice storage unit, performs the recognition processing by using a voice recognition unit, and displays a recognition result, and which, when the user provides an instruction for switching among recognition dictionaries because the result is an erroneous recognition, makes a recognition dictionary control unit switch among the voice recognition dictionaries by using a recognition result control unit and then makes the voice recognition unit perform the recognition processing on the voice stored in the voice storage unit (for example, refer to patent reference 2).

[Patent reference 1] JP, 6-318097, A (pp. 2 to 3 and FIGS. 1 to 4)

[Patent reference 2] JP, 2000-200093, A gazette (pp. 3 to 5 and FIGS. 1 to 5)

Because the conventional voice recognition apparatus which is constructed as mentioned above switches among voice recognition dictionaries according to the features (a tone) of a voice inputted by an unspecified speaker and simply compares the features of the inputted voice with those of a voice stored in a voice recognition dictionary while switching among the voice recognition dictionaries until the degree of matching between the features of the inputted voice and those of a voice stored in a voice recognition dictionary reaches a reference value, the conventional voice recognition apparatus must store many words in each of the voice recognition dictionaries in order to improve the recognition rate of the inputted voice even if it has the plurality of voice recognition dictionaries. A problem with the conventional voice recognition apparatus is therefore that it is difficult to reduce the time required to make a search for a word through the voice recognition dictionaries.

Furthermore, when the displayed voice recognition result is an erroneous recognition, the conventional voice recognition apparatus switches among the voice recognition dictionaries according to the user's switching instruction and performs the voice recognition again, though the user has to view the displayed voice recognition result and input an instruction for switching among the voice recognition dictionaries when judging that the voice recognition result indicates erroneous recognition. Thus, the operation for acquiring a voice recognition result indicating correct recognition of the inputted voice is troublesome, and it takes much time for the user to acquire the correct voice recognition result. Particularly, the user of a voice recognition apparatus for use in a car navigation apparatus may be unable to concentrate on driving if he or she has to input an instruction for switching among voice recognition dictionaries while he or she drives.

The present invention is made in order to solve the above-mentioned problems, and it is therefore an object of the present invention to provide a voice recognition apparatus which is easy to operate and which can reduce the voice recognition processing time and can improve the recognition rate.

DISCLOSURE OF THE INVENTION

A voice recognition apparatus in accordance with the present invention is characterized in that it includes: a plurality of voice recognition dictionaries which correspond to predetermined classification items, respectively; an erroneous recognition judging means for judging whether or not the voice recognition result indicates erroneous recognition; a recognition dictionary management means for switching among the voice recognition dictionaries when the erroneous recognition judging means judges that the voice recognition result indicates erroneous recognition; and a voice recognition means for carrying out voice recognition of the inputted voice with reference to a switched-to voice recognition dictionary so as to acquire a voice recognition result.

As mentioned above, because the voice recognition apparatus in accordance with the present invention is so constructed as to judge whether or not the voice recognition result indicates erroneous recognition, and to switch among the voice recognition dictionaries and continue to carry out the voice recognition processing, the present invention provides an advantage of being able to switch among the voice recognition dictionaries and perform the voice recognition without having to make the user perform any special operation, thereby reducing the time required for the voice recognition processing and improving the recognition rate.

BRIEF DESCRIPTION OF THE FIGURES

FIG. 5 is a flowchart for explaining a third example of the operation of the voice recognition apparatus shown in FIG. 1;

FIG. 6 is a diagram showing an example of a priority region classification table showing voice recognition dictionaries for use in the voice recognition apparatus shown in FIG. 1, and their priorities;

FIG. 7 is a flow chart for explaining a fourth example of the operation of the voice recognition apparatus shown in FIG. 1;

FIG. 8 is a diagram showing an example of a recognition management information table showing the frequency of use of each voice recognition dictionary for use in the voice recognition apparatus shown in FIG. 1.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
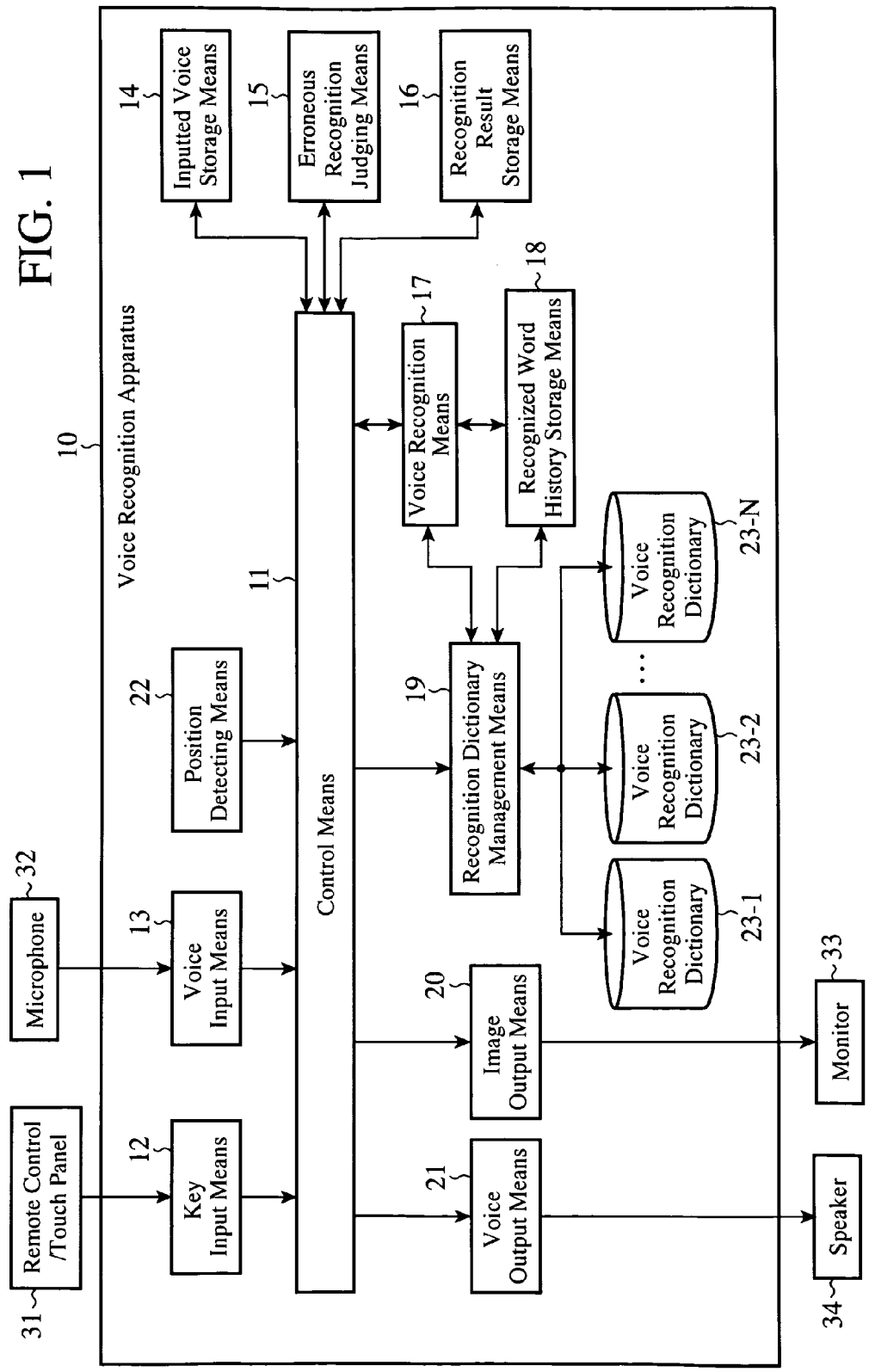
FIG. 1 is a block diagram showing an example of a voice recognition apparatus in accordance with Embodiment 1 of the present invention.

FIG. 1 is a block diagram showing an example of a voice recognition apparatus in accordance with Embodiment 1 of the present invention, and the illustrated voice recognition apparatus 10 is used in, for example, a car navigation apparatus. The illustrated voice recognition apparatus 10 is provided with a control means 11, a key input means 12, a voice input means 13, an inputted voice storage means 14, an erroneous recognition judging means 15, a recognition result storage means 16, a voice recognition means 17, a recognized word history storage means 18, a recognition dictionary management means 19, an image output means 20, a voice output means 21, and a position detecting means 22, and also has a plurality of voice recognition dictionaries 23-1 to 23-N (N is an integer equal to or larger than 2). Vocabularies are stored in the voice recognition dictionaries 23-1 to 23-N, respectively, in such a manner that words are classified by a different category (e.g., by region or genre) in each of them, as will be mentioned later.

A remote control/touch panel 31 which a user uses to perform a manual operation (a manual input) is connected to the key input means 12, and a microphone 32 which a user uses to perform a voice input is connected to the voice input means 13. A monitor 33 and a speaker 34 are connected to the image output means 20 and the voice output means 21, respectively.

The key input means 12 receives a key input from the remote control/touch panel 31 and then delivers the key input to the control means 11, and the voice input means 13 receives a voice from the microphone 32 and then delivers the voice to the control means 11. When the control means 11 receives the inputted voice from the voice input means 13, the control means stores this inputted voice in the inputted voice storage means 14 and also delivers the inputted voice to the voice recognition means 17. On the other hand, the recognition dictionary management means 19 selects, as a selected voice recognition dictionary, either one of the voice recognition dictionaries 23-1 to 23-N under the control of the control means 11, and the voice recognition means 17 performs a voice recognition process on the inputted voice with reference to the selected voice recognition dictionary so as to acquire a voice recognition result.

The voice recognition result is sent to the erroneous recognition judging means 15 via the control means 11, and the erroneous recognition judging means 15 judges whether or not the voice recognition result indicates erroneous recognition in such away as will be mentioned below. Furthermore, the voice recognition result is stored in the recognition result storage means 16. When the erroneous recognition judging means judges that the voice recognition result indicates erroneous recognition, the erroneous recognition judgment result is delivered to the control means 11, and, when receiving the erroneous recognition judgment result, the control means 11 controls the recognition dictionary management means 19 so as to cause the recognition dictionary management means to select another voice recognition dictionary as the selected voice recognition dictionary. The control means 11 also reads the inputted voice from the inputted voice storage means 14 and then delivers the inputted voice to the voice recognition means 17, and the voice recognition means 17 performs the voice recognition process again with reference to the selected voice recognition dictionary so as to acquire a voice recognition result.

When the voice recognition dictionary is thus changed and the voice recognition process is repeatedly carried out and the erroneous recognition judging means 15 finally determines that the voice recognition result does not indicate erroneous recognition, the voice recognition result is delivered from the recognition result storage means 16 to the image output means 20 and/or the voice output means 21 via the control means 11, so that the voice recognition result is displayed on the monitor 33 as an image or a telop and is outputted as a sound from the speaker 34.

When the voice recognition apparatus 10 is mounted in such a moving object as a vehicle, the position detecting means 22 detects the current position of the vehicle and provides the vehicle's current position to the control means 11. The control means 11 then controls the recognition dictionary management means 19 according to the vehicle's current position in such a way as will be mentioned below so as to select one of the voice recognition dictionaries 23-1 to 23-N. In the illustrated example, the voice recognition apparatus 10 is provided with the position detecting means 22. Instead of being provided with the position detecting means 22, the voice recognition apparatus 10 can receive the vehicle's current position from a car navigation apparatus (not shown).

Next, the operation of the voice recognition apparatus will be explained.

Figure 2:
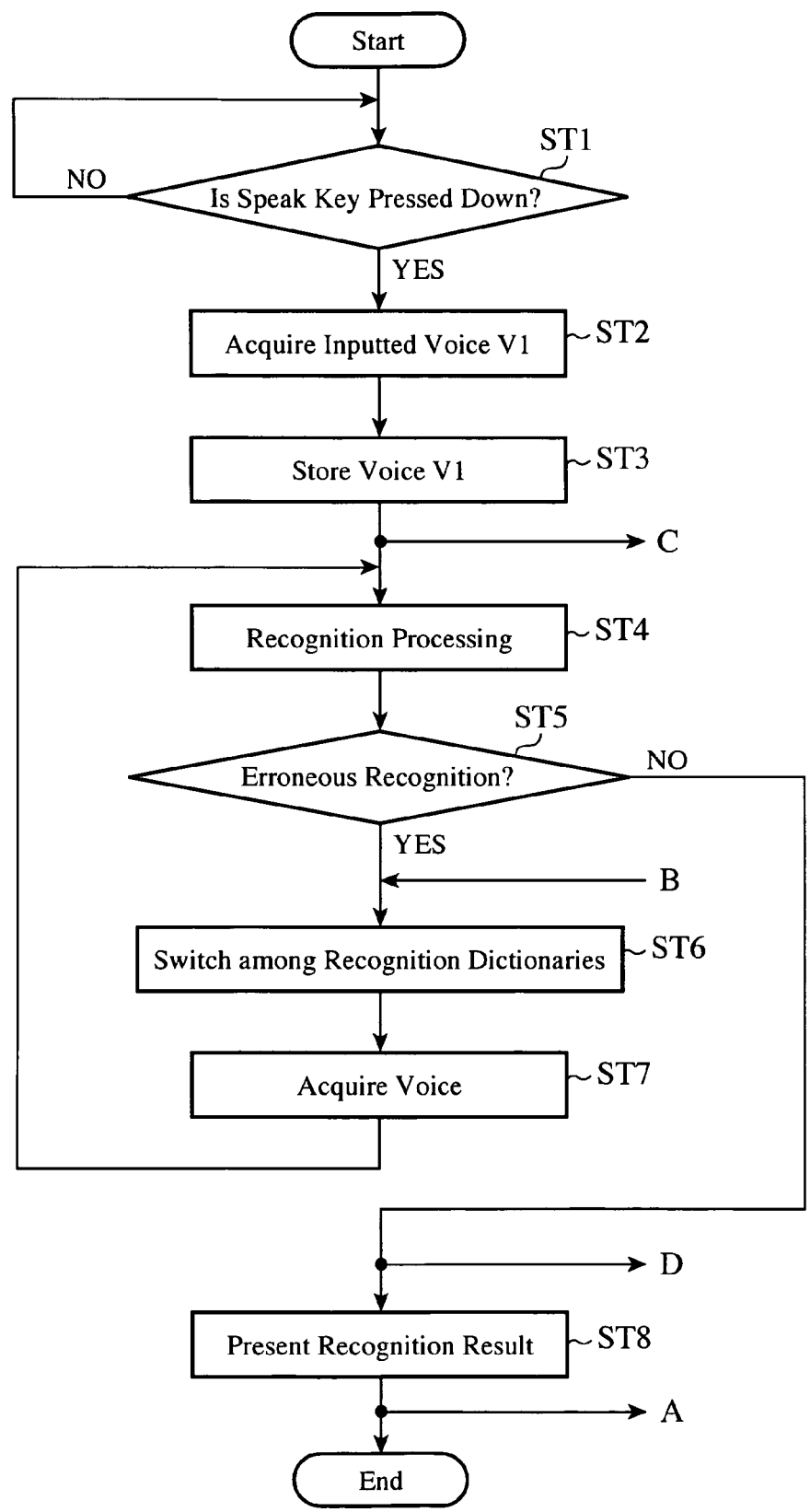
FIG. 2 is a flow chart for explaining a first example of the operation of the voice recognition apparatus shown in FIG. 1.

Referring to FIGS. 1 and 2, the control means 11 monitors whether or not a speak key (not shown) of the remote control/touch panel 31 is pressed down via the key input means 12 (step ST1), and, when the speak key is pressed down, acquires an inputted voice V1 received by the voice input means 13 (step ST2) and stores the inputted voice in the inputted voice storage means 14 (step ST3).

After that, the control means 11 selects, as a selected voice recognition dictionary, one of the voice recognition dictionaries 23-1 to 23-N in an order which is defined beforehand by controlling the recognition dictionary management means 19 (in this case, assume that the voice recognition dictionaries are sequentially selected in order of the voice recognition dictionaries 23-1, . . . , and 23-N), and then delivers the inputted voice to the voice recognition means 17. The voice recognition means 17 performs a voice recognition process on the inputted voice V1 with reference to the voice recognition dictionary 23-1 so as to acquire a voice recognition result W1 (step ST4).

This voice recognition result W1 is then delivered to the control means 11, and the control means 11 delivers the voice recognition result to the erroneous recognition judging means 15. The erroneous recognition judging means 15 then judges whether or not the voice recognition result W1 indicates erroneous recognition (step ST5). The erroneous recognition judging means 15 uses a degree of matching (a matching degree) of the features of the inputted voice, and, when the voice recognition result W1 does not have a matching degree equal to or greater than a predetermined matching degree, determines that the voice recognition result indicates erroneous recognition.

For example, a range of matching degrees from "0" (not-matching) to "100" (matching) is provided, and any case in which the voice recognition result W1 does not have a matching degree equal to or greater than 50 is defined as erroneous recognition. As a result, the erroneous recognition judging means 15 judges that the recognition result indicates erroneous recognition when the matching degree of the voice recognition result W1 is 30, whereas it judges that the recognition result does not indicate erroneous recognition when the matching degree of the voice recognition result W1 is 60.

When judging that the voice recognition result indicates erroneous recognition, the erroneous recognition judging means 15 notifies the control means 11 that the voice recognition result indicates erroneous recognition. The control means 11 controls the recognition dictionary management means 19 so as to switch from the voice recognition dictionary 23-1 to the voice recognition dictionary 23-2 by using the recognition dictionary management means 19 (step ST6). After that, the control means 11 reads the inputted voice V1 from the inputted voice storage means 14 (voice acquisition: step ST7) and returns the processing to step ST4, and the voice recognition means 17 then performs the voice recognition process on the inputted voice V1 again with reference to the voice recognition dictionary 23-2 so as to acquire a voice recognition result W2.

This voice recognition result W2 is stored in the recognition result storage means 16, and erroneous recognition judgment is performed on the voice recognition result W2 by the erroneous recognition judging means 15 in step ST5. When the erroneous recognition result indicates erroneous recognition again, the control means, in step ST6, performs a switching from the voice recognition dictionary 23-2 to the voice recognition dictionary 23-3, and the voice recognition means performs the voice recognition process on the inputted voice V1 with reference to the voice recognition dictionary 23-3.

In contrast, when the erroneous recognition judging means, in step ST5, judges that the voice recognition result does not indicate erroneous recognition, the control means 11 delivers the voice recognition result to the image output means 20 and/or the voice output means 21, and displays the voice recognition result on the monitor 33 and also outputs the voice recognition result from the speaker 34 (recognition result presentation: step ST8).

Thus, because the voice recognition apparatus is so constructed as to judge whether or not the voice recognition result indicates erroneous recognition, and, when judging that the voice recognition result indicates erroneous recognition, and to switch among the voice recognition dictionaries and continue to carry out the voice recognition processing, the voice recognition apparatus can switch among the voice recognition dictionaries and can perform the voice recognition without having to make the user perform any special operation, and can therefore reduce the time required for the voice recognition processing and can improve the recognition rate.

By the way, there may be a case in which even when the erroneous recognition judging means 15 judges that the voice recognition result does not indicate erroneous recognition and displays the voice recognition result on the monitor 33, the voice recognition result is not the one which the user desires. To solve this problem, after presenting the voice recognition result to the user in step ST8, the voice recognition apparatus causes the processing to branch to a routine as shown by "A" of FIG. 2.

Figures 3, 4:
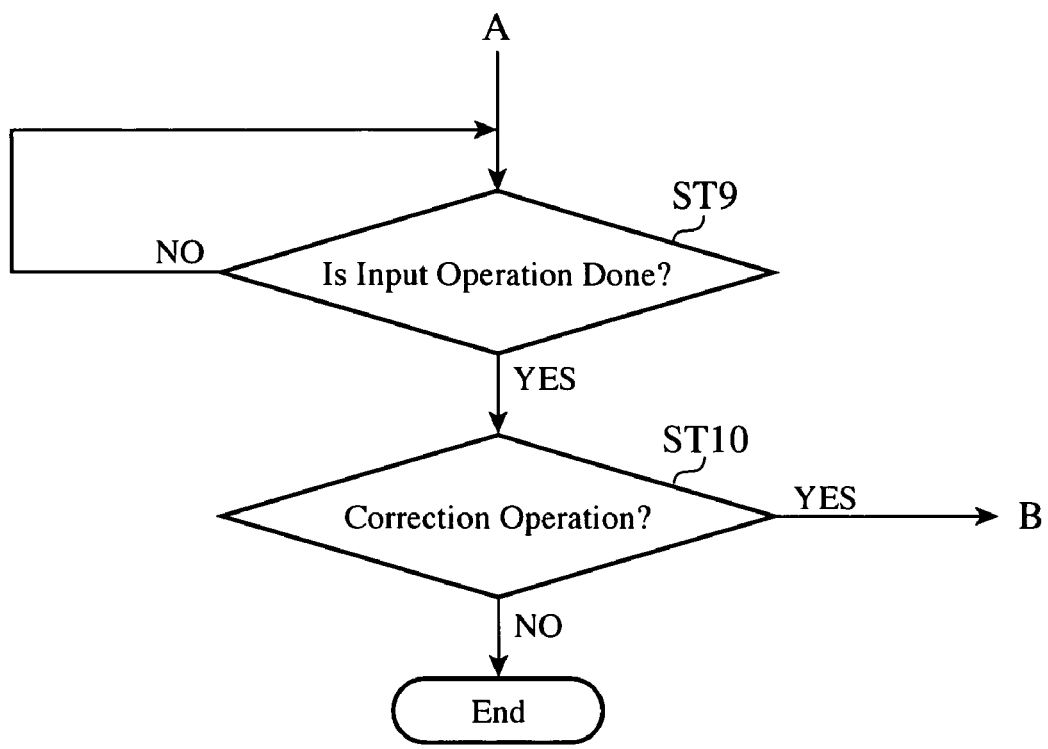
FIG. 3 is a flow chart for explaining a second example of the operation of the voice recognition apparatus shown in FIG. 1.
FIG. 4 is a diagram showing an example of a local classification table showing voice recognition dictionaries for use in the voice recognition apparatus shown in FIG. 1, and corresponding regions.

Referring to FIG. 3, after presenting the voice recognition result to the user in step ST8, the control means 11 monitors whether any user input operation from the key input means 12 or the voice input means 13 is provided for this voice recognition result (step ST9). When a user input operation is done for the voice recognition result, the control means 11 judges whether or not the user input operation is the one which makes a request to carry out a new recognition process for the voice recognition result (for example, the control means judges whether the user input operation is a correction operation or a next operation: step ST10). When the user input operation is a request to carry out a new recognition process, the control means 11, as shown by "B" of FIG. 2, returns to step ST6 in which the control means switches among the voice recognition dictionaries and then performs the voice recognition process again.

Thus, because the voice recognition apparatus is so constructed as to, after presenting the voice recognition result to the user, switch among the voice recognition dictionaries and continue the voice recognition process again when receiving a request to carry out a new recognition process from the user, the voice recognition apparatus can perform the voice recognition processing associated with the inputted voice V1 without having to make the user input an inputted voice V1 again, and not only can easily provide a voice recognition result which the user desires, but also can improve the recognition rate.

Next, an example in which the voice recognition apparatus switches among the voice recognition dictionaries according to the current position at which the vehicle equipped with the voice recognition apparatus 10 is travelling will be explained. Assume that the voice recognition apparatus 10 has voice recognition dictionaries 23-1 to 23-4 (i.e., N=4), and these voice recognition dictionaries 23-1 to 23-4 are classified by region. For example, as shown in FIG. 4, the voice recognition dictionaries 23-1, 23-2, 23-3, and 23-4 correspond to region categories (classification items): "Hokkaido", "Tokyo", "Saitama", and "Osaka", respectively. A region classification table (recognition dictionary management information) as shown in FIG. 4 is set up in the recognition dictionary management means 19.

In this case, after storing the inputted voice V1 in the inputted voice storage means 14 in step ST3 of FIG. 2, the voice recognition apparatus causes the processing to branch to a routine as shown by "C" of FIG. 2. Referring to FIG. 5, the control means 11 acquires the vehicle's current position C1 from the position detecting means 22 (step ST11), and selects the voice recognition dictionary which corresponds to the vehicle's current position C by using the recognition dictionary management means 19 so as to select the voice recognition dictionary corresponding to the vehicle's current position C1 (recognition dictionary switching: step ST12). For example, when the vehicle's current position C1 is Tokyo, the recognition dictionary management means 19 refers to the region classification table and the control means selects the voice recognition dictionary 23-2 by using the recognition dictionary management means 19.

After that, the control means 11 reads the inputted voice V1 from the inputted voice storage means 14 and delivers the inputted voice to the voice recognition means 17, and the voice recognition means 17 performs the voice recognition process on the inputted voice V1 with reference to the voice recognition dictionary 23-2 so as to acquire a voice recognition result W1 (voice recognition process: step ST13). This voice recognition result W1 is delivered to the control means 11, and the control means 11 delivers the voice recognition result W1 to the erroneous recognition judging means 15. The erroneous recognition judging means 15 judges whether or not the voice recognition result W1 indicates erroneous recognition (step ST14).

When judging that the voice recognition result indicates erroneous recognition, the erroneous recognition judging means 15 notifies the control means 11 that the voice recognition result indicates erroneous recognition. The control means 11 acquires the vehicle's current position C2 from the position detecting means 22 again (step ST15). When the vehicle's current position C1 differs from the vehicle's current position C2, the recognition dictionary management means 19 selects the voice recognition dictionary associated with a prefecture corresponding to the vehicle's current position C2 with reference to the region classification table (dictionary switching: step ST16).

In contrast, when the vehicle's current position C1 does not differ from the vehicle's current position C2, the recognition dictionary management means 19 selects the voice recognition dictionary corresponding to a prefecture which is close to the vehicle's current position C2 with reference to the region classification table (for example, when the vehicle's current position C2 is Tokyo, the recognition dictionary management means selects the voice recognition dictionary 23-3 corresponding to Saitama prefecture close to the vehicle's current position C2).

Next, the control means 11 reads the inputted voice V1 from the inputted voice storage means 14 (voice acquisition: step ST17) and returns the processing to step ST13, and the voice recognition means 17 performs the voice recognition process on the inputted voice V1 again with reference to the selected voice recognition dictionary so as to acquire a voice recognition result W2. The erroneous recognition judging means 15 then, in step ST14, performs erroneous recognition judgment on the voice recognition result W2. When the erroneous recognition judging means judges that the voice recognition result indicates erroneous recognition again, the control means 11, in step ST15, acquires the vehicle's current position again from the position detecting means 22 and switches among the voice recognition dictionaries.

In contrast, when the erroneous recognition judging means, in step ST14, judges that the voice recognition result does not indicate erroneous recognition, the control means 11 delivers the voice recognition result to the image output means 20 and/or voice output means 21, and displays the voice recognition result on the monitor 33 and also outputs the voice recognition result from the speaker 34 (recognition result presentation: step ST18).

Thus, because the voice recognition apparatus is so constructed as to classify the voice recognition dictionaries by region in advance and switch among the voice recognition dictionaries according to the vehicle's current position, the voice recognition apparatus can perform the voice recognition using a voice recognition dictionary most suitable for the vehicle's current position. As a result, the voice recognition apparatus can reduce the time required to carry out the voice recognition processing and can improve the recognition rate.

By the way, for the region classification table shown in FIG. 4, the user can set up a priority for each voice recognition dictionary by using, for example, the remote control/touch panel 31. FIG. 6 is a diagram showing an example of the region classification table (the recognition dictionary management information: a region priority classification table) in which each voice recognition dictionary has a priority. In the illustrated example, priorities "4", "1", "3", and "2" are assigned to "Hokkaido", "Tokyo", "Saitama", and "Osaka", respectively. In the case in which the priorities are thus set up, when, in step ST6 shown in FIG. 2, switching among the voice recognition dictionaries, the voice recognition dictionary management means 19 judges the priorities with reference to the region priority classification table and then switches to one of the voice recognition dictionaries in order of descending priority.

Thus, in the case in which a priority is defined for each voice recognition dictionary, because each of the voice recognition dictionaries can be used in turn in order of descending priority, not only the voice recognition processing speed can be improved, but also the recognition rate can be improved.

Referring now to FIG. 7, when the erroneous recognition judging means 15, in step ST5 of FIG. 2, judges that the voice recognition result does not indicate erroneous recognition, the voice recognition apparatus can cause the processing to branch a routine as shown by "D" of FIG. 2. That is, when the erroneous recognition judging means, in step ST5, judges that the voice recognition result does not indicate erroneous recognition, the voice recognition apparatus advances to step ST19 shown in FIG. 7. In step ST19, information (a non-erroneous recognition signal) showing that the voice recognition result does not indicate-erroneous recognition is provided to the recognition dictionary management means 19 via the control means 11, and the recognition dictionary management means 19 updates the recognition management information table shown in FIG. 8.

In this case, this recognition management information table is stored, as recognized word history information, in the recognized word history storage means 18, and the recognition dictionary management means 19 counts up the number of times of recognition which corresponds to the voice recognition dictionary which is used when performing the voice recognition processing by one in response to the non-erroneous recognition signal (storage of the number of times of recognition: step ST19).

In the example shown in FIG. 8, "convenience store", "gas station", and "family restaurant" are used as the classification items, and the voice recognition dictionaries 23-1, 23-2, and 23-3 correspond to "convenience store", "gas station", and "family restaurant", respectively.

When the number of times of recognition is stored in the way as mentioned above, the control means 11 delivers the voice recognition result to the image output means 20 and/or the voice output means 21, and displays the voice recognition result on the monitor 33 and also outputs the voice recognition result from the speaker 34 (recognition result presentation: step ST20). After that, when performing the voice recognition processing and then switching among the recognition dictionaries, the recognition dictionary management means 19, in step ST6 of FIG. 2, selects each of the voice recognition dictionaries in turn in order of decreasing number of times of recognition with reference to the recognition management information table.

Thus, because the voice recognition apparatus is so constructed as to store the number of times of recognition while associating it with a voice recognition dictionary which the voice recognition apparatus uses when judging that the voice recognition result does not indicate erroneous recognition, and to use each of the voice recognition dictionaries in turn in order of decreasing number of times of recognition when performing the voice recognition processing, the voice recognition apparatus can use a voice recognition dictionary containing words with a higher frequency of use by the user. As a result, not only the voice recognition processing speed can be improved, but also the recognition rate can be improved.

Figure 9:
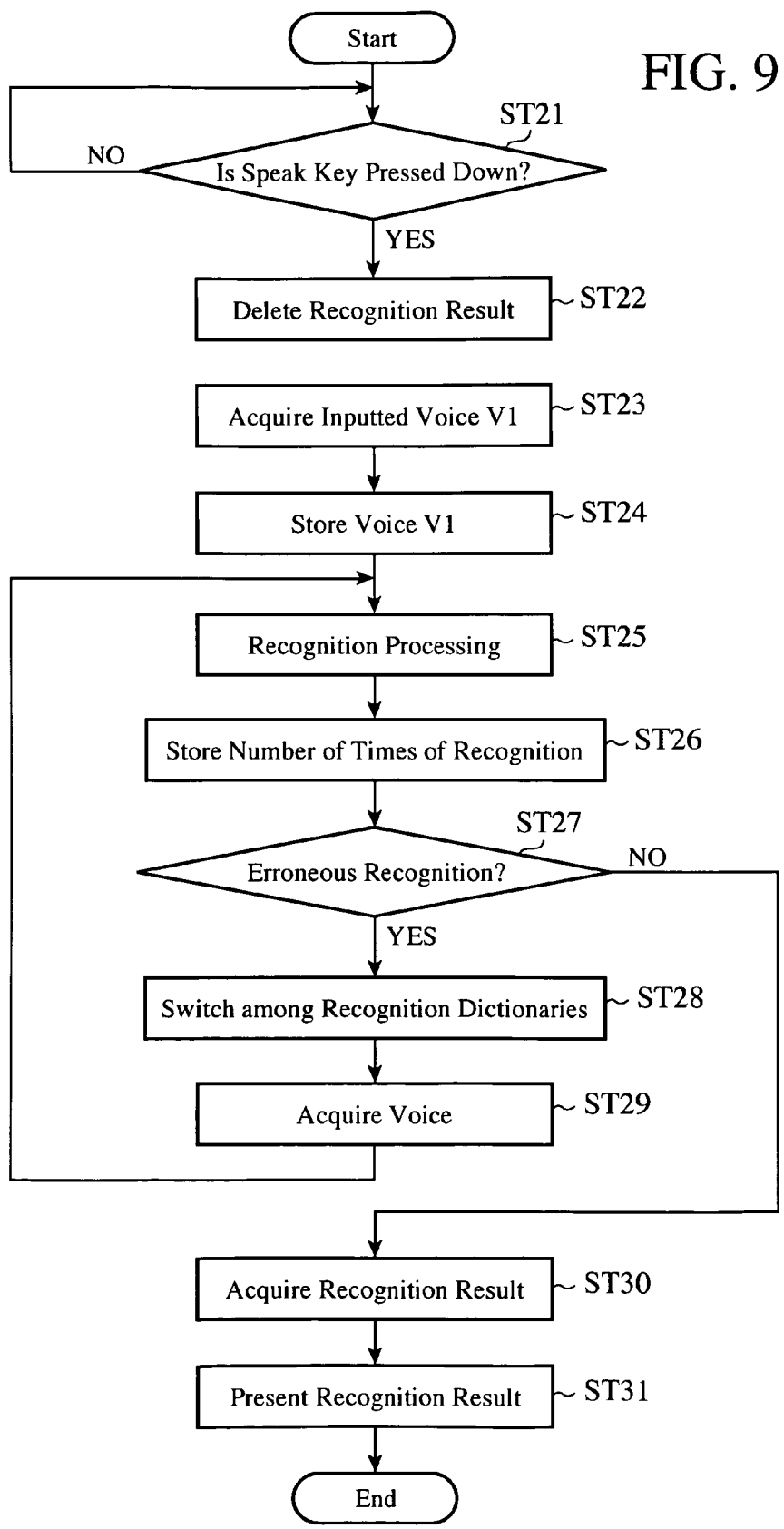
FIG. 9 is a flow chart for explaining a fifth example of the operation of the voice recognition apparatus shown in FIG. 1.

Referring next to FIGS. 1 and 2 and FIGS. 1 and 9, the control means 11 monitors whether or not the speak key of the remote control/touch panel 31 is pressed down via the key input means 12 (step ST21), and, when the speak key is pressed down, the control means 11 resets the recognition result storage means 16 (recognition result deletion: step ST22), acquires the inputted voice V1 received by the voice input means 13 (step ST23), and stores the inputted voice in the inputted voice storage means 14 (step ST24).

After that, the control means 11 controls the recognition dictionary management means 19 to select, as a selected voice recognition dictionary, one of the voice recognition dictionaries 23-1 to 23-N in an order which is defined in advance (in this case, each of the voice recognition dictionaries is selected in turn in order of the voice recognition dictionaries 23-1, . . . , and 23-N), and then delivers the inputted voice to the voice recognition means 17. The voice recognition means 17 performs the voice recognition process on the inputted voice V1 with reference to the voice recognition dictionary 23-1 so as to acquire a voice recognition result W1 (recognition processing: step ST25).

This voice recognition result W1 is delivered to the control means 11, and the control means 11 stores the voice recognition result W1 in the recognition result storage means 16 and also delivers the voice recognition result to the erroneous recognition judging means 15 (step ST26). The erroneous recognition judging means 15 then judges whether or not the voice recognition result W1 indicates erroneous recognition (step ST27).

When judging that the voice recognition result indicates erroneous recognition, the erroneous recognition judging means 15 notifies the control means 11 that the voice recognition result indicates erroneous recognition. The control means 11 controls the recognition dictionary management means 19 to switch from the voice recognition dictionary 23-1 to the voice recognition dictionary 23-2 by using the recognition dictionary management means 19 (step ST28).

After that, the control means 11 reads the inputted voice V1 from the inputted voice storage means 14 (voice acquisition: step ST29) and returns the processing to step ST4. The voice recognition means 17 performs the voice recognition processing on the inputted voice V1 again with reference to the voice recognition dictionary 23-2 so as to acquire a voice recognition result W2.

This voice recognition result W2 is stored in the recognition result storage means 16, and erroneous recognition judgment is performed on the voice recognition result W2 by the erroneous recognition judging means 15 in step ST27. When the erroneous recognition judging means judges that the voice recognition result indicates erroneous recognition again, the control means, in step ST28, performs a switching from the voice recognition dictionary 23-2 to the voice recognition dictionary 23-3, and the voice recognition means performs the voice recognition processing on the inputted voice V1 with reference to the voice recognition dictionary 23-3.

In contrast, when the erroneous recognition judging means, in step ST27, judges that the voice recognition result does not indicate erroneous recognition, the control means 11 acquires all the voice recognition results stored in the recognition result storage means 16 (step ST30), delivers them to the image output means 20 and/or the voice output means 21, and displays all the voice recognition results on the monitor 33 and also outputs all the voice recognition results from the speaker 34 (step ST31).

Thus, because the voice recognition apparatus is so constructed as to store the voice recognition result in the recognition result storage means regardless of whether or not the voice recognition result indicates erroneous recognition, and read all the voice recognition results from the recognition result storage means and present all the voice recognition results to the user when judging that the current voice recognition result does not indicate erroneous recognition, the user can browse all the voice recognition results associated with all of the switchings among the voice recognition dictionaries and can therefore select one of them which the user desires from these voice recognition results. As a result, the recognition rate can be improved.

As mentioned above, because the voice recognition apparatus according to this Embodiment 1 switches among the voice recognition dictionaries and then performs the voice recognition processing again when the voice recognition result indicates erroneous recognition, the present embodiment offers an advantage of being able to reduce the time required to carry out the voice recognition processing and improve the recognition rate without having to perform any special operation.

Because the voice recognition apparatus according to this Embodiment 1 switches among the voice recognition dictionaries and performs the voice recognition processing again when receiving a request for a new recognition process from the user after presenting the voice recognition result to the user, the present embodiment offers an advantage of being able to not only easily provide a voice recognition result which the user desires, but also improve the recognition rate.

Because the voice recognition apparatus according to this Embodiment 1 provides a voice recognition dictionary for every region and switches among the voice recognition dictionaries according to the current position, the present embodiment offers an advantage of being able to perform the voice recognition using a voice recognition dictionary most suitable for the current position.

Because the voice recognition apparatus according to this Embodiment 1 provides a priority for every voice recognition dictionary, the present embodiment offers an advantage of being able to perform the voice recognition using a voice recognition dictionary with a higher priority, thereby improving the recognition rate.

Because the voice recognition apparatus according to this Embodiment 1 stores a history of use of each of the voice recognition dictionaries at the time when judging that the voice recognition result does not indicate erroneous recognition and selects a voice recognition dictionary on the basis of this use history, the present embodiment offers an advantage of being able to use a voice recognition dictionary having a higher frequency of use, thereby improving the recognition rate.

Because the voice recognition apparatus according to this Embodiment 1 stores any voice recognition result therein and, when judging that the voice recognition result does not indicate erroneous recognition, presents all the voice recognition results therein to the user, the present embodiment offers an advantage of being able to enable the user to browse all the voice recognition results associated with all of the switchings among the voice recognition dictionaries and therefore select one of them which the user desires from these voice recognition results.

INDUSTRIAL APPLICABILITY

As mentioned above, the voice recognition apparatus in accordance with the present invention is easy to operate and can reduce the time required to carry out the voice recognition processing, and can therefore improve the recognition rate. For example, the voice recognition apparatus in accordance with the present invention is suitable for use in a voice recognition apparatus for use in a car navigation apparatus or the like.

The invention claimed is:

1. A voice recognition apparatus which carries out voice recognition of an inputted voice with reference to a voice recognition dictionary, and outputs a voice recognition result, said voice recognition apparatus comprising:
   storage equipment on which are stored a plurality of voice recognition dictionaries which correspond to predetermined classification items, respectively;
   a controller-based device programmed to:
   judge whether or not said voice recognition result indicates erroneous recognition;
   switch among said voice recognition dictionaries when said erroneous recognition judging means judges that said voice recognition result indicates erroneous recognition; and
   carry out voice recognition of said inputted voice with reference to a switched-to voice recognition dictionary so as to acquire said voice recognition result.

2. The voice recognition apparatus according to claim 1, wherein said voice recognition apparatus outputs the voice recognition result which is judged not to indicate erroneous recognition, and the controller-based device switches among the voice recognition dictionaries when receiving an input command indicating that the outputted voice recognition result is inappropriate.

3. The voice recognition apparatus according to claim 1, wherein
   regions are used as the classification items and the voice recognition dictionaries are provided for the predetermined regions, respectively,
   said voice recognition apparatus has a position detector mounted in a moving object, for detecting a current position of said moving object, and
   the controller-based device switches among said voice recognition dictionaries according to a region corresponding to the current position detected by said position detector.

4. The voice recognition apparatus according to claim 1, wherein said voice recognition apparatus has dictionary management information which defines use priorities of the voice recognition dictionaries, and said controller-based device switches among said voice recognition dictionaries with reference to said dictionary management information.

5. The voice recognition apparatus according to claim 1, wherein said voice recognition apparatus has a recognized word storage unit for storing a history about usage of a voice recognition dictionary which said voice recognition apparatus uses when carrying out voice recognition to acquire the voice recognition result which is judged not to indicate erroneous recognition, and the controller-based device switches among said voice recognition dictionaries according to the usage history stored in said recognized word storage unit.

6. The voice recognition apparatus according to claim 1, wherein
   said voice recognition apparatus outputs the voice recognition result,
   said voice recognition apparatus further comprises a recognition result storage unit for storing said voice recognition result, and
   said controller-based device reads all voice recognition results stored in said recognition result storage unit and causes them to be output when it is judged that the voice recognition result does not indicate erroneous recognition.

7. The voice recognition apparatus according to claim 1, wherein each of the plurality of voice recognition dictionaries each has a vocabulary of words classified in a different category than the vocabularies of the other voice recognition dictionaries.

8. The voice recognition apparatus according to claim 1, wherein the plurality of voice recognition dictionaries are stored in separate storage locations of the storage equipment.

* * * * *